United States Patent [19]

Littler et al.

[11] Patent Number: 5,028,326

[45] Date of Patent: Jul. 2, 1991

[54] APPARATUS FOR SEPARATING ORGANIC MATERIAL FROM SLUDGE

[75] Inventors: Robert D. Littler, Chagrin Falls; William F. Schuller, Fairview Park; Reed S. C. Rogers, Strongsville, all of Ohio

[73] Assignee: The Standard Oil Company, Cleveland, Ohio

[21] Appl. No.: 290,987

[22] Filed: Dec. 28, 1988

Related U.S. Application Data

[63] Continuation-in-part of Ser. No. 278,967, Dec. 2, 1988, which is a continuation-in-part of Ser. No. 906,727, Sep. 12, 1986, abandoned.

[51] Int. Cl.$^5$ .............................. C02F 1/40; C02F 1/26
[52] U.S. Cl. .................................... 210/251; 210/511; 210/609
[58] Field of Search ................... 210/251, 511, 609; 202/107, 176; 422/225, 232, 261, 267, 269, 274, 286, 287, 310

[56] References Cited

U.S. PATENT DOCUMENTS

| | | | |
|---|---|---|---|
| Re. 31,913 | 6/1985 | Barger | 422/267 |
| 1,025,622 | 5/1912 | Grossmann | 202/176 |
| 2,037,218 | 4/1936 | Empson | 210/48 |
| 2,235,639 | 3/1941 | Koch | 196/5 |
| 2,383,362 | 8/1945 | Batchelder | 196/5 |
| 2,383,363 | 8/1945 | Batchelder | 196/4 |
| 2,454,653 | 11/1948 | Kamp | 210/55 |
| 3,202,605 | 8/1965 | Redcay | 208/337 |
| 3,276,994 | 10/1966 | Andrews | 210/251 |
| 3,937,023 | 2/1976 | Williamson | 210/251 |
| 4,157,281 | 6/1979 | Burkhardt et al. | 202/176 |
| 4,224,136 | 9/1980 | Kocker et al. | 208/8 |
| 4,273,644 | 6/1981 | Harris et al. | 208/321 |
| 4,311,561 | 1/1982 | Hastings | 196/14.52 |
| 4,335,001 | 6/1982 | Yves et al. | 210/708 |
| 4,416,764 | 11/1983 | Gikis et al. | 208/11 |
| 4,434,028 | 2/1984 | Eppig et al. | 196/14.52 |

Primary Examiner—Joye L. Woodard
Attorney, Agent, or Firm—Larry W. Evans; David J. Untener; Teresan W. Gilbert

[57] ABSTRACT

Apparatus and process useful in the separation of undesirable organics from various types of compositions including sludge. The apparatus comprises a contactor vessel, a sludge conduit for conveying sludge to the contactor vessel, and a sludge cutter for reducing the sludge conveyed by the conduit to reduced cross-section extrudates for deposition in the contactor vessel. The sludge cutter includes a foraminous member and can operate to roughen the surface of the extrudates to provide increased surface area for contacting with solvent. The sludge cutter is arranged to effect free fall of the reduced cross-section extrudates from the sludge cutter for initiating breakup of the extrudates into reduced length segments. A deflector preferably is positioned in the path of the free-falling extrudates to promote further breakup of the extrudates into relatively short segments or pellets. Provision is made for reversing the sludge cutter for flow of sludge through the sludge cutter in opposite directions, thereby to enable self-cleaning of the sludge cutter. The process comprises the steps of: forming a porous fixed bed of the composition in a contactor vessel, contacting the composition in the bed with at least one organic solvent capable of dissolving the extractable material to form an effluent containing the solvent and extractable material, and admitting water into the contactor vessel for flow through the bed to displace residual effluent remaining in the vessel and at least partially filling the vessel with water. A one-way drive arrangement is provided to enable operation of a first rotatable operator independently of a second rotatable operator while using only a single drive shaft to rotate both operators.

23 Claims, 3 Drawing Sheets

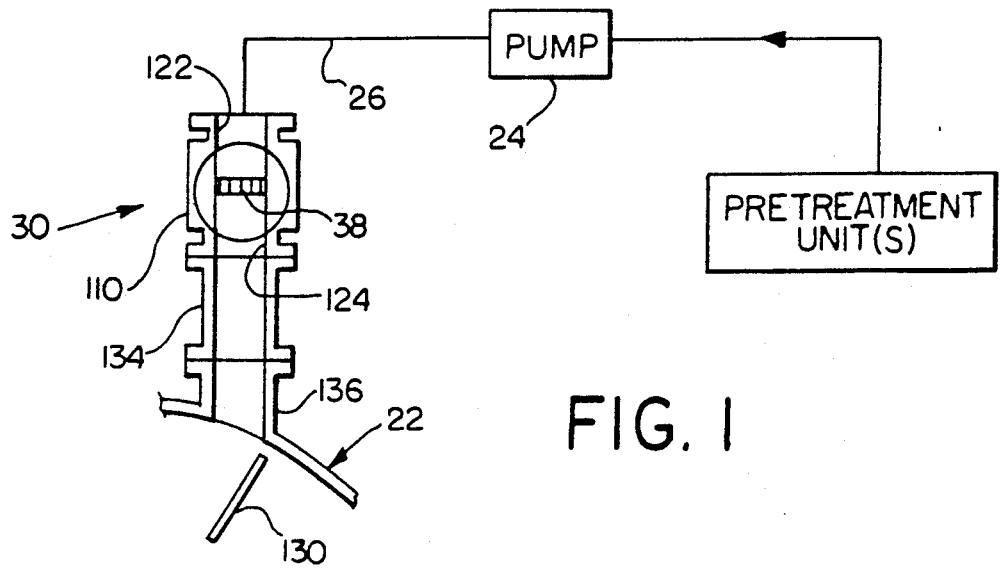
FIG. 1
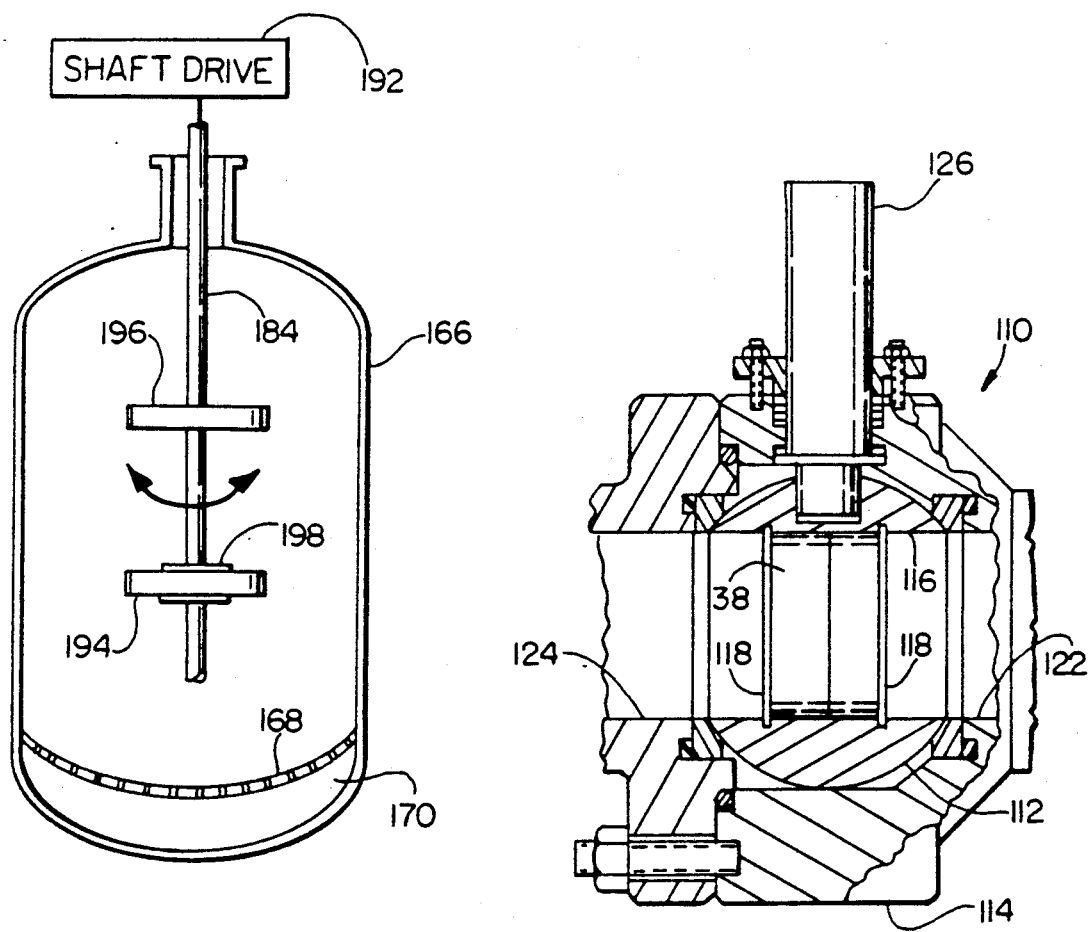
FIG. 9
FIG. 2

APPARATUS FOR SEPARATING ORGANIC MATERIAL FROM SLUDGE

RELATED APPLICATION DATA

This application is a continuation-in-part of U.S. Application Ser. No. 278,967, filed Dec. 2, 1988, which is a continuation-in-part of U.S. Application Ser. No. 906,727, filed Sept. 12, 1986, now abandoned. The disclosure of said prior applications are hereby incorporated herein in their entirety.

Technical Field

This invention relates to apparatus and processes useful in separating an extractable organic material from a composition comprising said extractable organic material intermixed with solids and/or water. The apparatus and process of the invention are particularly useful for separating undesirable organics from various types of sludge or sludge-like compositions including solid wastes and hazardous wastes (e.g., petroleum waste, refinery sludge, and the like), and from other extrudable compositions containing extractable material.

BACKGROUND OF THE INVENTION

Oily wastewater streams are generated at many different refinery processing units and discharged to a refinery wastewater treatment system where treatment by gravity separation and dissolved air flotation generates oily solid streams. These oily solid wastes are regulated under the Resource, Conservation, and Recovery Act (RCRA) as listed hazardous wastes. Additionally, sludge from leaded product tanks, slop oil emulsion solids, and heat exchanger bundle solids are considered listed hazardous waste. These sludges as a group are typically 4–6% solids and 15–20% oil as generated. 15,000 to 20,000 gal/day are generated at a typical petroleum refinery.

Many refineries currently deliquify these wastes and either land dispose or land treat the remaining solids. However, the 1984 Amendments to RCRA required the Environmental Protection Agency (EPA) to identify and promulgate a system of pretreatment of all hazardous wastes prior to land disposal or land treatment. EPA's choice of pretreatment was required to be based on the best demonstrated available technology and was required by Congress to be in effect by Aug. 8, 1988 for petroleum refinery wastes. If EPA did not meet this deadline, the legislative "hammer" would be the automatic prohibition of land disposal for the waste in question. This prohibition would take effect May 8, 1990. Various technologies for treating listed hazardous refinery oil sludges to render them delistable or acceptable for land disposal under the RCRA landban have been suggested, but none have been found to be entirely satisfactory.

U.S. Pat. No. 4,311,561 discloses an apparatus and method for extracting bitumen from tar sand wherein the tar sand and a solvent flow in one direction through a plurality of interconnected individually sealed extraction chambers with the flow of extracted bitumen and solvent counter to the flow of tar sand and solvent. The solvents identified as being useful are hexane, pentane, benzene, halogenated liquids and xylene. The amount of bitumen in the tar sand is progressively reduced from reaction chamber to reaction chamber until the final chamber where sand and solvent alone are treated with hot water to remove the solvent and then discharge pure sand.

U.S. Pat. No. 4,434,028 discloses an apparatus and process for removing oil and other organic constituents from particulate, inorganic-rich mineral solids (e.g., oil-contaminated drill cuttings) using an extractant that is in a gaseous state at atmospheric pressure and ambient temperature and is converted to a liquid or supercritical fluid during the extraction process. The process involves the steps of: separating the drill cuttings from a drilling mud in a separator; slurrying the cuttings using an oil or aqueous liquid in a slurry tank; conveying the slurry to an extractor column; circulating liquefied extractant through the extractor column in contact with the drill cuttings until the desired level of oil is extracted; advancing the extractant-oil mixture from the extractor column through a pressure reduction valve to a separator-evaporator wherein the extractant-oil mixture separates into two phases, one being an extractant phase and the other being an oil-enriched phase. The extractant phase is recirculated to the extractor column. The oil-enriched phase is subjected to subsequent separations wherein the extractant is separated from the oil. Upon completion of the extraction cycle, a water piston is advanced through the extractor column to remove remaining oil and extractant from the drill cuttings. Water is then added to the clean drill cuttings to form a slurry in the extractor column which is removed and disposed of or further treated.

There is a need for efficient, economical and reliable apparatus and processes for separating undesirable organics from solid wastes, hazardous wastes, and the like, to render the product solids delistable or acceptable for land disposal. It would be advantageous if these apparatus and processes were adaptable to separating extractable organic materials from other compositions wherein such extractable organic materials are intermixed with solids and/or water.

SUMMARY OF THE INVENTION

This invention provides an apparatus and process useful in the separation of an extractable organic material from a composition comprising said extractable organic material intermixed with solids and/or water. The apparatus and process of the invention are particularly useful for separating undesirable organics from various types of sludge or sludge-like compositions including solid wastes and hazardous wastes (e.g., petroleum waste, refinery sludge, and the like), and from other extrudable compositions containing organic material.

According to one aspect of the invention, apparatus for conditioning sludge or other extrudable compositions containing organic material for separation of the organic material therefrom, comprises: a contactor vessel; conveying means including a conduit for conveying the extrudable composition to the contactor vessel; and cutter means for reducing the extrudable composition conveyed by the conveying means through the conduit to reduced cross-section extrudates for deposition in the contactor vessel. Said apparatus is useful in combination with means for admitting solvent to the contactor vessel for contacting the extrudates to extract organic material therefrom The cutter means includes a foraminous member through which the extrudable composition is forced by the conveying means. Specific types of foraminous members include a screen (as is preferred), a perforated plate, or a network of interlocking partitions.

The cutter means preferably is operative to roughen and create fissures in the surface of the extrudates to provide increased surface area for contacting with solvent. The cutter means preferablly is arranged to effect free fall of the reduced cross-section extrudates from the cutter means for initiating breakup of the extrudates into reduced length segments. Preferably a deflector or obstruction is positioned in the path of the free-falling extrudates to promote further breakup of the extrudates into relatively short segments or pellets. Provision is made for reversing the cutter means for flow of the extrudable composition through the cutter means in opposite directions, thereby to enable self-cleaning of the cutter means, i.e., removal of fouling foreign matter built up on the upstream face of the cutter element.

According to another aspect of the invention, apparatus useful for separating extractable organic material from a composition including the extractable organic material intermixed with solids and/or water comprises: a contactor vessel into which the composition is loaded for contact with a solvent to extract organic material from the composition; a first rotatable operator in the contactor vessel; a second rotatable operator in the contactor vessel; a shaft extending into the contactor vessel; drive means for rotating the shaft in a first direction and an opposite second direction; means for connecting the first operator to the shaft for rotation of the first operator when the shaft is rotated in at least the first direction: and means for coupling the second operator to the shaft for rotation of the second operator when the shaft is rotated in the second direction while permitting the shaft to rotate relative to the second operator when the shaft is rotating in the first direction.

According to another aspect of the invention, a cutter assembly for use in solvent extraction apparatus wherein organic material is separated from sludge or other extrudable compositions containing the extractable organic material and solids and/or water, comprises: a sludge cutter element having opposite faces and a plurality of die openings extending between the faces through which sludge is extruded to form reduced cross-section extrudates; a housing for the cutter element, the housing having an inlet and an outlet for sludge respectively upstream and downstream of the cutter element; and means for reversing the sludge cutter element relative to the inlet and outlet, whereby the opposite faces of the cutter element can be alternately faced upstream and downstream of the cutter element. Preferably the housing includes a ball valve including a valve ball having a flow passage, and the sludge cutter element is disposed within the flow passage.

According to another aspect of the invention, a sludge cutter element for use in solvent extraction apparatus wherein organic material is separated from sludge or the like, comprises: an annular member circumscribing a flow passage through the cutter; a foraminous member extending transversely across the passage and secured to the annular member; and means extending transversely across the passage for reinforcing the foraminous member against forces developed from forced flow of sludge through the foraminous member.

According to another aspect of the invention, a process for separating an extractable material from a composition comprising the extractable material intermixed with solids and/or water, comprises the steps of: (a) forming a porous fixed bed of the composition in a contactor vessel; (b) contacting the composition in the fixed bed with at least one organic solvent capable of dissolving the extractable material to form an effluent containing the solvent and extractable material; and (c) admitting water into the contactor vessel for flow through the fixed bed to displace residual effluent remaining in the vessel after step (b) and at least partially and preferably completely filling the vessel with water.

The foregoing and other features of the invention are described in detail below with reference to the appended drawings.

BRIEF DESCRIPTION OF THE DRAWINGS

FIG. 1 is a schematic vertical sectional view of a portion of a contactor vessel having a sludge cutter assembly according to the invention.

FIG. 2 is a sectional view of the sludge cutter assembly of FIG. 1.

FIG. 9 is a schematic sectional view of apparatus employing a dual service shaft assembly according to the invention.

DETAILED DESCRIPTION

Figure 3:
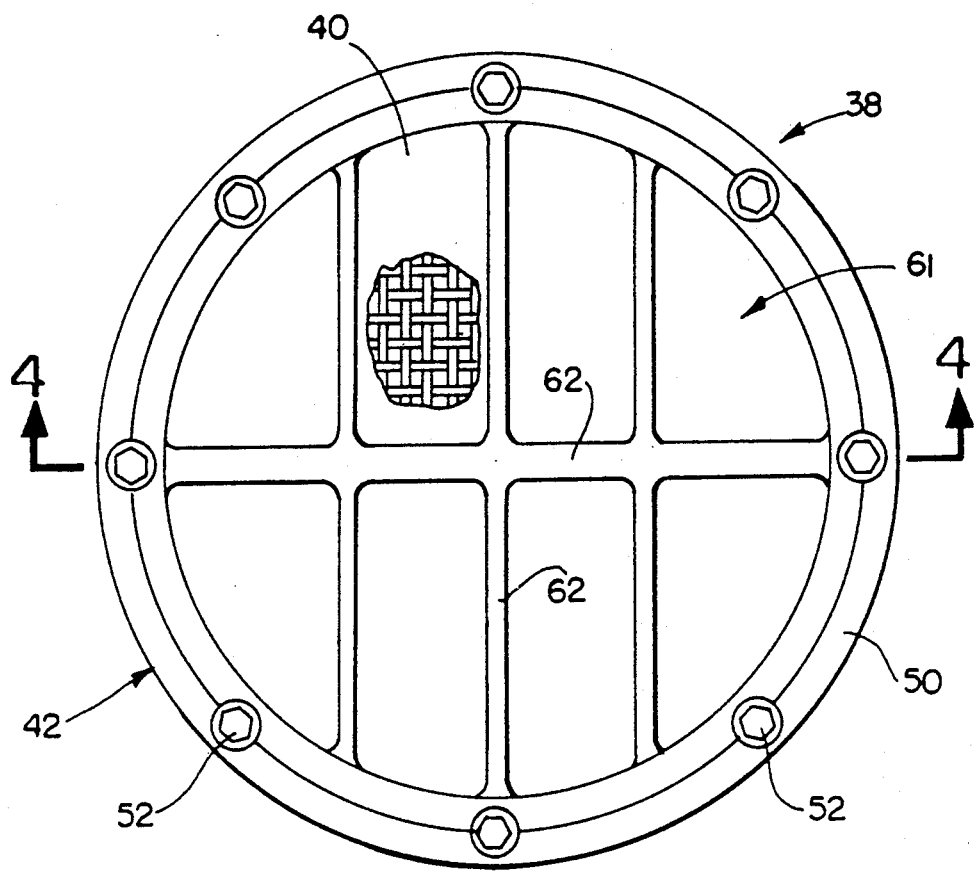
FIG. 3 is a plan view of one form of sludge cutter element useful in the sludge cutter assembly.

Referring now in detail to the drawings, a sludge cutter assembly according to the invention is indicated generally at 30. Sludge cutter assembly 30 can be employed in extractor apparatus in performance of the process described in U.S. Application Ser. No. 278,967. That process provides for treatment of feed compositions comprising an extractable organic material intermixed with solids and water. The extractable organic material can be in liquid or solid state at the pressure and temperature employed in performance of the process. The solids can be in any form, but in many instances are in the form of particulate solids. The solids can be porous, and in many instances these porous solids are filled with liquid (e.g., water, organic liquid). These compositions can include free water. The term "free water" is used herein to refer to water that does not adhere to the surface of the solids of the feed composition or is not trapped within voids in such solids. When free water is present, it is preferable and in most instances necessary to separate out at least part of the free water either using conventional separation techniques (e.g., filtration, centrifugation, settling, etc.) prior to the process. Generally at least about 20%, preferably at least about 50%, more preferably at least about 90% of the free water is separated out.

Sludge cutter assembly 30, in particular, can be used in connection with the process as employed to separate organic material from various types of sludges and sludge-like compositions including, for example, solid waste and/or hazardous waste, including petroleum waste, refinery sludge and production sludge. The term "solid waste herein refers to any waste material not excluded by EPA definitions. The term "hazardous waste" herein refers to solid waste or combinations of solid waste which are "listed" by the EPA as hazardous, or which exhibit ignitability, corrosivity or reactivity, or are considered toxic pursuant to relevant governmental rules or regulations. The term "petroleum waste" refers to any waste material containing petroleum or hydrocarbon oil intermixed with solids and water. The term "refinery sludge" refers to sludges generated in petroleum refinery operations that contain petroleum or hydrocarbon oils intermixed with solids and water; these sludges usually contain heavy residual organics such as asphaltenes. The term "production sludge" refers to sludges generated at the well head of an oil well; these sludges typically contain oil, water, bitumen, tar sand, dirt, clay, pipe scale, drilling residues, and the like.

The process disclosed in U.S. Application Ser. No. 278,967 comprises the steps of: (A) contacting the feed composition with a first organic solvent, the first organic solvent being capable of dissolving at least about ten parts of the extractable organic material per million parts of the first organic solvent at the temperature wherein at least about 50% by weight of said first organic solvent boils at atmospheric pressure; dissolving at least part of the extractable organic material in the first organic solvent to form a first solution; and separating at least part of the first solution from said feed composition to provide an intermediate composition, part of the first organic solvent remaining intermixed with the intermediate composition; and (B) contacting the intermediate composition with a volatile organic solvent, the volatile organic solvent being capable of dissolving at least about ten parts of the first organic solvent per million parts of the volatile organic solvent at the temperature wherein at least about 50% by weight of the volatile organic solvent boils at atmospheric pressure; dissolving at least part of the first organic solvent in the volatile organic solvent to form a second solution; and separating the second solution from the intermediate composition to provide a treated product. The feed composition and first organic solvent may be maintained at a sufficient temperature during step (A) of the process to vaporize and separate out part or all of the water present in the feed composition.

Sludge to be treated may be pretreated to remove some of the water and organic liquid (e.g., oil). Pretreatment units that are particularly useful include vacuum filters, belt presses, filter presses or a combination of the foregoing. A dryer to further de-water the feed composition can be used. The pretreated feed composition coming off the pretreatment units can be placed in holding bins.

The pre-treated feed composition can be mixed with one or more filter aids to facilitate the formation of and/or insure the retention of a fluid-permeable mass or bed of solids. The filter aids can be selected from those materials having relatively low bulk densities when compared to the feed composition and a structural integrity that does not degrade significantly when in contact with the organic material intermixed with the solids in the feed composition or the solvents used to separate the organic material from the solids.

Sludge, after any pretreatment and/or mixing with filter aids, can be conveyed to and through sludge cutter 30. A pump 24 is employed to pump the sludge via conduit 26 to sludge cutter assembly 30 which, for example, may be mounted above a contactor vessel 22. Although reference will be made to sludge in the following description of a sludge cutter assembly according to the invention, said assembly can also be used with other extrudable compositions, such as tar sands for example, for conditioning and sizing the same for extraction of organic material therefrom.

The sludge, which has or is pretreated to a putty-like consistency, is pumped through sludge cutter assembly 30 for sludge conditioning, i.e., surface texturing and size reduction. Sludge cutter assembly 30 operates to reduce the sludge to small cross-section extrudates while providing a suitable surface texture to facilitate solvent extraction. As is desired the extrudates preferably are given a rough or fuzzy surface texture to increase the surface area that may be contacted by solvent and further to enhance permeation of solvent through the extrudates. This is more preferred than a smooth surface which is slick rather than fuzzy in appearance.

Various foraminous sludge conditioning elements can be used in sludge cutter assembly 30. In FIG. 3, a preferred sludge conditioning or cutter element 38 can be seen to include a screen 40 mounted in a screen housing or holder 42. This cutter element is operative to roughen the surface and can create fissures in the surface of the extrudates, whereas the below described embodiment shown in FIGS. 5 and 6 has been found to provide a more smooth surface texture which is usually less desirable.

Screen 40 preferably is a wire screen cloth formed of hardened wire to withstand abrasion by sludge being forced through the openings in the wire cloth. Sludge sizing may be varied by using different wire screens for different sludge consistencies. The desired size of the openings can be determined empirically for different sludge consistencies. However, a 6 mesh, 0.054 inch wire diameter screen cloth has been found to be particularly useful in conditioning refinery sludge. In general, the mesh opening preferably is less than about ½ inch and greater than about 1/16 inch for most sludges, more preferably between about ¼ inch to about 1/16 inch, and still more preferably about ⅛ inch to provide extrudates about ⅛ inch square in cross-section.

Screen housing 42 includes upper and lower holders or holder halves 46 and 48 between which screen 40 is sandwiched. Upper holder 46 includes an annular rim 50 including circumferentially equally spaced apertures for fasteners 52 which are engaged in threaded holes 54 in annular rim 56 of lower holder 48. Upper and lower holders 46 and 48 have corresponding central openings 58 and 60 which combine to form a cutter flow passage 61. Openings 58 and 60 are respectively criss-crossed by screen support ribs or spines 62 and 64 which form an open gridwork. Support ribs 62 support screen 40 across opening 58 against the forces exerted thereagainst during forced flow of sludge through the screen in the direction of arrow 70, whereas the support ribs 64 support the screen across opening 60 against the forces exerted thereagainst during forced flow of sludge through the screen in the direction of arrow 72. As discussed further below, sludge may flow through the sludge cutter element in either axial direction.

Preferably support ribs 62 and 64 are aligned with each other and are relatively narrow so as to obstruct only a minimal amount of flow of sludge through cutter flow passage 61 while providing support for screen 40. The ribs for example may be from about ⅛ to ¼ inch thick and about ½ to 1 inch deep when spanning, in the manner shown, a cutter flow passage having about a 5 inch diameter. The axially outer ends of upper and lower holders 46 and 48 are tapered at their inner diameters as seen at 74 and 76, respectively, to facilitate entry of sludge into the sludge cutter element in either axial direction.

Figure 5:
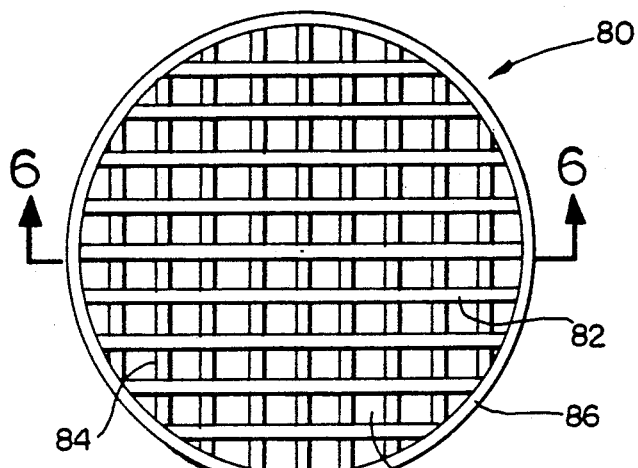
FIG. 5 is a plan view of another form of sludge cutter element.
Figure 6:
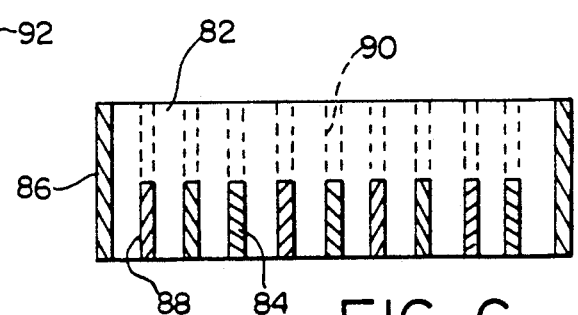
FIG. 6 is a sectional view of the FIG. 5 sludge cutter element taken along the line 6—6 of FIG. 5.

Referring now to FIGS. 5 and 6, another embodiment of sludge cutter element according to the invention is indicated generally at 80. Sludge cutter element 80 (partition plate type) is formed from two sets of interlocking slotted partitions or plates 82 and 84 forming a gridwork circumscribed by an annular rim or ring 86. Plates 82 of one set each include a row of transversely spaced apart slots 88 which extend from the bottom edge of the plate. Plates 84 of the other set each include a row of transversely spaced slots 90 which extend from the top edge of the plate. The plates in each set extend at right angles to the plates in the other set and have portions thereof received in the slots of the other set as shown. The resultant gridwork forms a plurality of openings 92 through which sludge can be extruded to form small cross-section extrudates. Openings 92 are rectangular in cross-section except for the peripheral openings which are rounded at two sides. Each set of plates includes a longest plate aligned with a diameter of rim 86 and chordal plates at each side of the longest plate which progressively decrease in length moving away from the longest plate.

Figure 7:
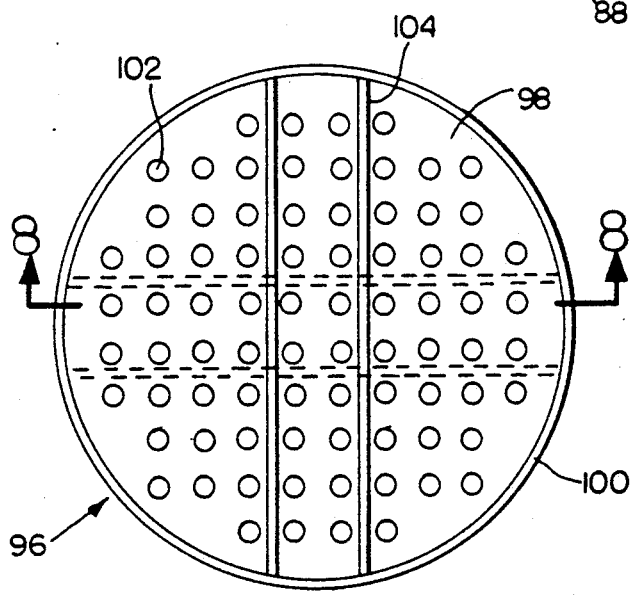
FIG. 7 is a plan view of still another form of sludge cutter element.
Figure 8:
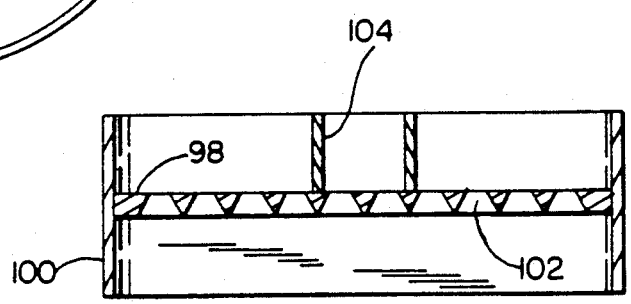
FIG. 8 is a sectional view of the FIG. 7 sludge cutter element taken along the line 8—8 of FIG. 7.

In FIGS. 7 and 8, still another embodiment of sludge cutter element can be seen at 96. Sludge cutter element 96 (perforated plate type) includes a circular plate 98 circumscribed by an annular rim or ring 100. Plate 98 has formed therein an array of holes 102. Holes 102 can be of any desired shape and can have side walls perpendicular to the plane of the plate or tapered (relieved) as seen in FIG. 8. Sludge cutter element 96 also includes reinforcing partitions 104 at both sides of perforated plate 98 for strengthening the plate which may have a thickness about the same as or on the order of the holes 102. Plate 98, partitions 104 and rim 100 are joined to each other such as by welding.

The openings provided in any of the above described sludge cutter elements may be referred to as die openings inasmuch as sludge is extruded through the openings to form small cross-section extrudates. The size and/or shape of the die openings can be varied for different sludge consistencies. In general, the die openings preferably have a maximum dimension or diameter less than about ¾ inch and a minimum dimension or diameter greater than about 1/16 inch, and more preferably less than about ½ inch and greater than about 1/16 inch. As above indicated, a preferred mesh opening provides extrudates of ⅛ inch square in cross-section. Extrudates having a square or rectangular cross-section are perceived as being preferable over a circular cross-section having the same area since the square or rectangular cross-section provides greater surface area for contacting with solvent.

Figure 4:
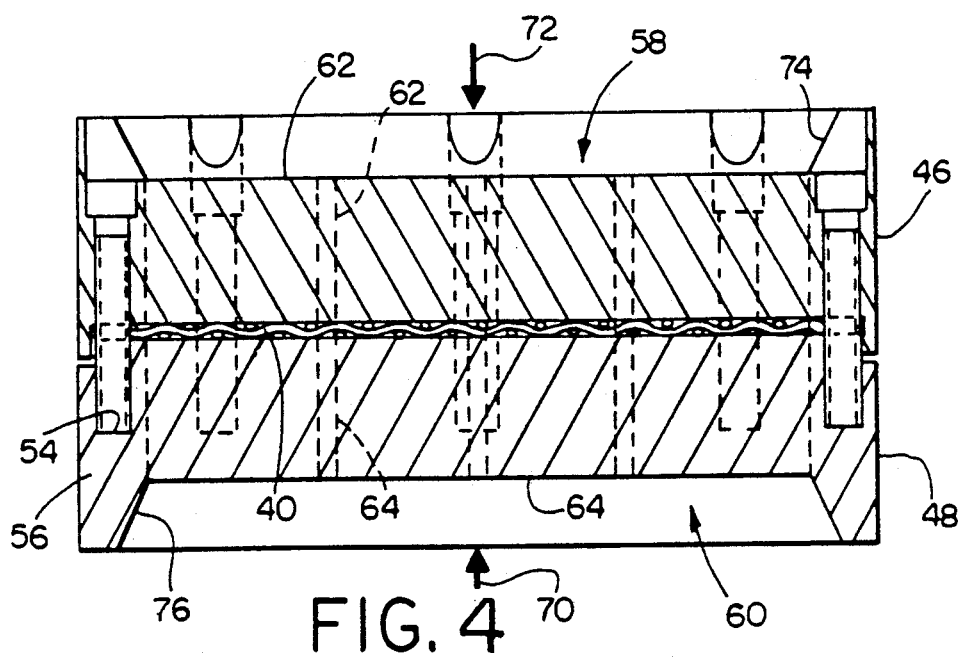
FIG. 4 is a sectional view of the FIG. 3 sludge cutter element taken along the line 4—4 of FIG. 3.

Regardless of the specific form of sludge cutter element employed, the sludge cutter element preferably is mounted in a ball valve 110 which may be of conventional type. In FIG. 2 ball valve 110 can be seen to include a valve ball 112 which is rotatable in valve housing 114. Sludge cutter element 38 of FIGS. 3 and 4 can be seen to be located in the bore or ball passage 116 of ball 112. Cutter element 38 is sized to closely fit within bore 116 with its axis aligned with that of the bore. Cutter element 38 is retained in bore 116 by axially spaced apart retainer rings 118 which are received in grooves provided in the wall of bore 116.

Valve housing 114 has an inlet passage 122 and an outlet passage 124. Rotation of the ball about an axis perpendicular to aligned axes of the inlet and outlet passages is effected by a valve shaft 126 connected to an actuator (not shown) of any desired type. The ball may be rotated through 180 degrees between positions aligning bore 116 with the inlet and outlet passages for flow of sludge through the valve and hence through the cutter element, but in opposite directions. In this manner the orientation of the cutter element relative to flow through the valve can be reversed. The ball may also be rotated to a 90 degree position to block flow of sludge through the valve, i.e., to close the valve and seal outlet passage 124 with respect to inlet passage 122. Hence, the ball valve can be used to close of the contactor vessel for pressurization of the contactor vessel, as may be desired in performance of the process.

In FIG. 2 ball valve 110 is shown oriented at right angle to its preferred orientation best illustrated in FIG. 1. As seen in FIG. 1 ball valve 110 has inlet passage 122 opening upwardly for connection to supply line 26 and its outlet passage 124 opening downwardly, for example, to the interior of contactor vessel 22. Outlet passage 124 preferably has a diameter at least equal to and preferably at least 10 percent greater than the diameter of the flow passage through the cutter element for substantially unihibited free fall of the small or reduced cross-section extrudates issuing from sludge cutter element 38 as sludge is forced downwardly through sludge cutter 38. As the sludge extrudates issue from the downstream side of cutter element 38 in each sludge cutter assembly, the extrudates will separate or break up by the effect of gravity into smaller length extrudates.

Sludge being fed to sludge cutter assembly 30 typically will include trash, debris or other particulate matter that will not pass through the openings in sludge cutter element 38. Such trash will accumulate on the upstream face of the cutter element. As the trash accumulates, flow through the cutter element will be progressively reduced and pressure upstream of the cutter will progressively increase. Unless the trash in cleared from the upstream face of the cutter element, the pressure differential across the cutter element may increase to a point causing damage to and/or plugging of the cutter element. Also, the increased pressure upstream from the cutter element may cause damage to sludge feed components.

The present invention provides for cleaning of the sludge cutter element by reversal of the sludge cutter element with respect to the sludge flow direction. This is effected by rotating ball 112 of ball valve 110 through 180 degrees thereby relocating the face of cutter element 38 previously at the upstream side thereof to the downstream side. After the cutter element has been rotated, sludge extruded through the cutter element will carry away the accumulated trash for discharge into the contactor vessel. The cutter element can remain at this position until it is again rotated to discharge trash accumulated on the upstream face of the cutter element or, if desired, immediately rotated back to its original position.

With reference to FIG. 1, the sludge extrudates from sludge cutter assembly 30 on the head of contactor vessel 22 preferably free-fall onto an obstruction 130 herein referred to as a deflector. As the sludge extrudates issue from the downstream side of cutter element 38 in the sludge cutter assembly, the extrudates will separate or break up by the effect of gravity into smaller length extrudates. Further break up of the extrudates will be effected as they drop onto the angled deflector and tumble down the deflector. The sludge extrudates preferably are broken into relatively short, discrete and cohesive elements herein referred to as sludge pellets or extrudate segments.

The sludge pellets desirably are between 1 inch and 1/16 inch in length, more preferably between ½ inch and ⅛ inch in length and still more preferably about ¼ inch in length, especially when the pellets are about ⅛ inch square in cross-section. More generally, the sludge extrudates are broken down to a segment length preferably no greater than about four times the diameter or cross-sectional width thereof and more preferably no greater than about three times the diameter or cross-sectional width of the extrudates.

As illustrated in FIG. 1, spool piece 134 is connected between sludge cutter assembly 30 and port 136 at the top of contactor vessel 22. The height of spool piece 134 can be selected to achieve desired sludge extrudate breaking and nonsticking impact on deflector 130 for different sludge consistencies. The spool piece may be variable in length or may be replaceable with a different length spool piece to obtain the desired drop distance for the sludge extrudates. The angle of the deflector may be adjusted to obtain desired results determined empirically for a given sludge or other extrudable composition.

Referring now to FIG. 9, a contactor vessel 166 can be seen to include an internal bed support 168. Bed support 168 forms the top of a lower plenum 170. Internal bed support 168 can function in conjunction with lower plenum 170 to provide for upflow or downflow distribution of flowing solvent essentially across the full bed bottom surface. In this regard the bed support is perforated over substantially the entire area thereof accessible to the fixed bed supported thereon.

In operation according to the process described in U.S. Application Ser. No. 278,967, a porous fixed bed of a feed composition is formed on internal bed support 168. As will be appreciated, this procedure can be applied to compositions other than those which can be conditioned and sized through the above described sludge cutter assembly. Step (A) of the above described process can now be effected by introducing the first organic solvent into contactor vessel 168 for passage through the bed for an effective period of time to extract a desired amount of the extractable organic material from the sludge in the bed and thus form a first solution of the extractable organic material and the solvent.

The first organic solvent may be introduced into contactor vessel 166 by any means suitable for the desired mode of solvent-sludge contacting such as by flow of solvents through the bed upwardly, downwardly or otherwise. For example, the first organic solvent can be admitted into lower plenum 170 and removed from contactor vessel 166 at the top thereof. Flow of the first organic solvent through the fixed bed dissolves the extractable organic materials that are intermixed with the solids in the sludge and displaces the resulting solution upwardly to and through an outlet at the top of the contactor vessel.

Step (A) of the inventive process can be repeated with additional solvent extractions until desired levels of extraction have been achieved. With subsequent extractions the same or different solvents can be used, and the same or different operating parameters (e.g., temperature, pressure, etc.) can be used.

Upon completion of step (A) the remaining free liquids in contactor vessel 166 can be removed by draining the contactor vessel or otherwise. The resulting product will be an intermediate composition which comprises the organic free or substantially organic free solids intermixed with the first organic solvent.

Step (B) of the process is used to extract the solvent from step (A) that remains intermixed with the solids. The volatile organic solvent can be advanced through the particulate solids at a sufficient rate to expand the bed (this may also be done with the first solvent). The flow of the volatile organic solvent through the bed solids is continued until a desired amount of the first organic solvent is extracted from the solids.

Flow of volatile organic solvent through the bed may be accomplished in the same manner as described above with respect to flow of the first organic solvent.

Step (B) of the inventive process is continued until the first organic solvent has been removed from the solids or until the level of such first organic solvent is reduced to an acceptable level. If the level of first solvent intermixed with the solids is not reduced to an acceptable level, subsequent repetitions of step (B) can be conducted. With subsequent extractions, the same or different volatile organic solvent can be used, and the same or different operating parameters (e.g., temperature, pressure, flow rate, etc.) can be used.

The resulting treated product produced from step (B) of the inventive process comprises primarily the solids and any remaining water from the original feed composition intermixed with the volatile organic solvent. The volatile organic solvent remaining intermixed with the solids preferably is separated from the solids by displacing the volatile organic solvent with water. Water is admitted into the lower plenum of contactor vessel 166 to form a water piston which is used to force the volatile organic solvent out through an outlet at the top of the contactor vessel. Preferably, water is admitted to fill the vessel to completely displace the volatile organic solvent from the vessel. If desired, the water temperature can be increased above ambient to improve the solvent disengagement through the solids.

Still referring to FIG. 9, a drive shaft 184 extends into a contactor vessel 166. The shaft extends through a port in the dome of the vessel for connection to a suitable reversible drive 192. The shaft may be supported and its exit from the contactor vessel sealed by conventional devices. Supported on the shaft are first and second rotatable operators 194 and 196 which may be any useful device requiring rotation within the vessel. Operator 194 is coupled to the shaft by a one-way clutch or similar device 198 for rotation with the shaft when the shaft rotates in one direction only while permitting the shaft to rotate relative to the operator when rotating in the opposite direction. Operator 196 is fixed to the shaft for rotation therewith in both directions of rotation, but it also can be coupled to the shaft by a one-way clutch device for rotation with the shaft when the shaft is rotating in said opposite direction and not in said one direction.

This arrangement enables a single drive shaft to provide independent operation of at least two rotated devices in a vessel. This is particularly desirable when space or other circumstances do not permit installation of a second drive shaft. In the above arrangement, the one-way clutch device avoids rotation of device or operator 194 while the other operator 196 is being rotated by the drive shaft turning in one direction. When the shaft is rotated in the reverse direction, operator 194 is rotated while operator 196 is also being rotated (in the illustrated embodiment) or is decoupled by its own one-way clutch device.

This arrangement, therefore, permits one drive shaft to perform at least two functions essentially independently of one another. This is especially beneficial when space limitations permit the installation of only one drive shaft in a vessel in the appropriate location. This arrangement also saves installation costs; eliminates the cost of installing and sealing a second shaft with respect to the pressure vessel.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. Apparatus for conditioning an extrudable composition containing organic material for separation of the organic material therefrom, comprising:
   a contactor vessel for organic material separation,
   conveying means including a conduit for conveying the extrudable composition to said contactor vessel, and
   cutter means for reducing the extrudable composition conveyed by said conveying means through said conduit to reduced cross-section extrudates for deposition in said contactor vessel.

2. Apparatus as set forth in claim 1, wherein said cutter means includes a foraminous member through which the extrudable composition is forced by said conveying means.

3. Apparatus as set forth in claim 2, wherein said foraminous member is a screen.

4. Apparatus as set forth in claim 2, wherein said foraminous member is a perforated plate.

5. Apparatus as set forth in claim 2 wherein said foraminous member includes a gridwork of interlocking transversely extending plates having a depth dimension in the flow direction substantially greater than their thickness.

6. Apparatus as set forth in claim 1, wherein said cutter means includes means operative to roughen the surface of said extrudates to provide increased surface area.

7. Apparatus as set forth in claim 1, wherein said conduit and cutter means are arranged so as to effect deposition of the extrudates in said contactor vessel by free fall of said reduced cross-section extrudates as they exit from said cutter means for initiating breakup of the extrudates into reduced length segments.

8. Apparatus as set forth in claim 7, including a deflector positioned beneath said cutter means in the path of the extrudates free-falling from said cutter means for further breakup of the extrudates into reduced length segments.

9. Apparatus as set forth in claim 1, including means for reversing said cutter means for flow of the extrudable composition through said cutter means in opposite directions, thereby to enable self-cleaning of said cutter means.

10. Apparatus as set forth in claim 9, wherein said means for reversing includes a sealing member rotatable in a housing.

11. Apparatus as set forth in claim 1, wherein said cutter means includes a foraminous member through which the extrudable composition is forced by said conveying means, and said foraminous member is mounted a ball valve having a ball in which.

12. Apparatus as set forth in claim 11, including means for rotating said ball to effect reversal of said foraminous member for flow of through said sludge cutter means in opposite directions.

13. Apparatus as set forth in claim 12, wherein said ball valve is operable to close off said contactor vessel with respect to said conduit upstream of said cutter means.

14. Apparatus as set forth in claim 1, further comprising
   a first rotatable operator in said contactor vessel,
   a second rotatable operator in said contactor vessel,
   a shaft extending into said contactor vessel,
   drive means for rotating said shaft in a first direction and an opposite second direction,
   means for connecting said first operator to said shaft for rotation of said first operator when said shaft is rotated in at least said first direction, and
   means for coupling said second rotatable operator to said shaft for rotation of said second operator when said shaft is rotated in said second direction while permitting said shaft to rotate relative to said second operator when said shaft is rotating in said first direction.

15. Apparatus as set forth in claim 1, wherein said cutter means includes:
   a cutter element having opposite faces and means defining a plurality of die openings extending between said faces through which the extrudable composition is extruded to form reduced cross-section extrudates,
   a housing for said cutter element, said housing having an inlet and an outlet for the extrudable composition respectively upstream and downstream of said cuter element, and
   means for reversing said cutter element relative to said inlet and outlet, whereby said opposite faces of said cutter element can be alternately faced upstream and downstream of said cutter element.

16. Apparatus as set forth in claim 15, wherein said housing includes a ball valve including a valve ball having a flow passage, and said cutter element is disposed within said flow passage.

17. Apparatus as set forth in claim 15, wherein said means defining a plurality of die openings comprises a foraminous member.

18. Apparatus as set forth in claim 17, wherein said foraminous member is a screen.

19. Apparatus as set forth in claim 17, wherein said foraminous member is a perforated plate.

20. Apparatus as set forth in claim 1, wherein said cutter means includes:
   an annular member circumscribing a flow passage through said cutter element,
   a foraminous member extending transversely across said passage and secured to said annular member, and
   means extending transversely across said passage for reinforcing said foraminous member against forces developed from forced flow of the extrudable composition through said foraminous member.

21. Apparatus as set forth in claim 20, wherein said foraminous member is a screen.

22. Apparatus as set forth in claim 20, wherein said foraminous member is a perforated plate.

23. Apparatus as set forth in claim 20, wherein said annular member is circular.

* * * * *

UNITED STATES PATENT AND TRADEMARK OFFICE
CERTIFICATE OF CORRECTION

PATENT NO. : 5,028,326

DATED : July 2, 1991

INVENTOR(S) : Robert D. Littler et al.

It is certified that error appears in the above-identified patent and that said Letters Patent is hereby corrected as shown below:

Column 12:

Claim 11, last 2 lines, "said foraminous member is mounted a ball valve having a ball in which" should read --a ball valve having a ball in which said foraminous member is mounted--.

Title page:
The "References Cited" should include --Dietrich et al, "Wet Oxidation of Hazardous Organics in Wastewater", Environmental Progress, Vol. 4, No. 3, pages 171-177 (August, 1985)--.

Signed and Sealed this

Sixth Day of July, 1993

Attest:

MICHAEL K. KIRK

Attesting Officer    Acting Commissioner of Patents and Trademarks

UNITED STATES PATENT AND TRADEMARK OFFICE
CERTIFICATE OF CORRECTION

PATENT NO. : 5,028,326
DATED : July 2, 1991
INVENTOR(S) : Robert D. Littler et al It is certified that error appears in the above-indentified patent and that said Letters Patent is hereby corrected as shown below:

Col. 12, claim 12, line 5, "through said sludge" should read --sludge through said--.

Signed and Sealed this

Seventh Day of December, 1993

Attest:

BRUCE LEHMAN

*Attesting Officer*  Commissioner of Patents and Trademarks